No. 819,039. PATENTED MAY 1, 1906.
M. BUNKER.
VEHICLE WHEEL.
APPLICATION FILED OCT. 26, 1905.
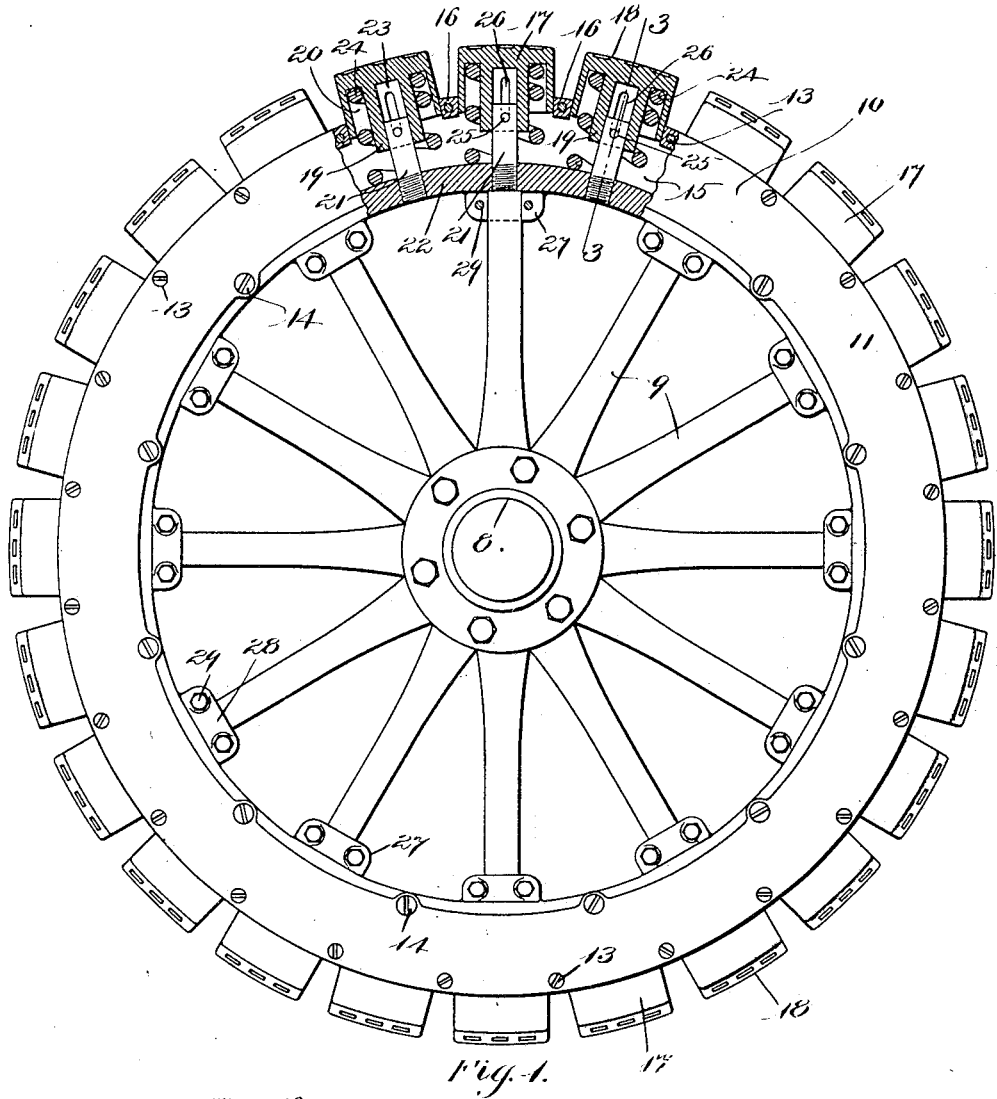
Fig. 1.
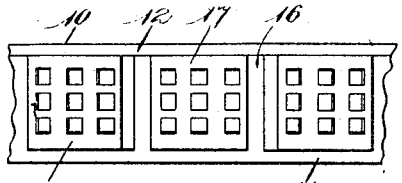
Fig. 2.
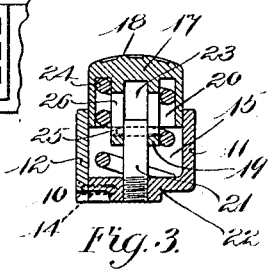
Fig. 3.
Witnesses:
William C. Glass
Ernest A. Telfer
Inventor:
Marcellus Bunker,
by his attorney, Charles S. Goding

UNITED STATES PATENT OFFICE.

MARCELLUS BUNKER, OF WOBURN, MASSACHUSETTS.

VEHICLE-WHEEL.

No. 819,039.  Specification of Letters Patent.  Patented May 1, 1906.

Application filed October 26, 1905. Serial No. 284,409.

*To all whom it may concern:*

Be it known that I, MARCELLUS BUNKER, a citizen of the United States, residing at Woburn, in the county of Middlesex and State of Massachusetts, have invented new and useful Improvements in Vehicle-Wheels, of which the following is a specification.

This invention relates to wheels for vehicles and is especially adapted for the wheels of power vehicles, such as automobiles and the like.

The object of the invention is to provide a wheel for vehicles which shall have a yielding periphery adapted to yield at one portion thereof without affecting other portions or without its being necessary that other portions should yield therewith, and, further, the object of the invention is to provide a wheel having a yielding periphery which cannot be punctured and deflated.

The invention consists in the combination and arrangement of parts set forth in the following specification and particularly pointed out in the claims thereof.

Referring to the drawings, Figure 1 is a side elevation of my improved vehicle-wheel, partly broken away and shown in section. Fig. 2 is a rear elevation of a portion of the rim with the yielding blocks attached thereto. Fig. 3 is a detail section, partly in elevation, taken on line 3 3 of Fig. 1.

Like numerals refer to like parts throughout the several views of the drawings.

In the drawings, 8 is the hub, 9 the spokes, and 10 the rim, of my improved motor-vehicle wheel. The rim 10 consists of two annular plates 11 and 12, fastened together by screws 13 14, and when so fastened together the resulting rim 10 is provided with a groove or annular space 15, extending around the periphery thereof. Partitions 16 16 extend laterally across the annular space 15, and between each of these partitions is arranged to slide a block 17, which is preferably rectangular in shape, but rounded at one end 18 thereof upon the arc of a circle concentric with the center of the hub 8. The series of blocks 17 17 is adapted to slide radially of said wheel, the outer ends of each of said blocks respectively projecting outwardly beyond the periphery of the rim 10.

Each of the blocks 17 has a post 19 extending radially inward toward the center of the wheel and surrounded by an annular recess 20. A series of radial pins 21 is fastened to the inner flange 22 of the rim 10, having screw-threaded engagement therewith and projecting therefrom through the annular space 15 and into a cylindrical recess 23, formed in the interior of the post 19. A spiral compression-spring 24 encircles the post 19 and projects into the annular recess 20, one end of said spring bearing against the flange 22 and the other against the block 17, whereby said block is held outwardly away from the center of the wheel with its curved outer end 18 projecting beyond the periphery of said rim.

A cross-pin 25 extends through the radial pin 21 and projects into radial slots 26, formed in diametrically opposite sides of the post 19. This cross-pin acts as a stop to prevent the block 17 from being forced outwardly beyond a certain point by the spiral spring 24. The blocks 17 are free to slide in the annular space 15 in a radial direction with relation to the hub 8, and said blocks are guided by the side walls 12 and 11 of the rim 10 as well as by the radial pins 21. These blocks form as a whole a yielding periphery for the rim of the wheel, which constitutes, in effect, a resilient tire, each of said blocks being adapted to consecutively contact with the support or with the ground upon which said wheel rests during the rotation thereof. Moreover, if any projecting substance, such as a stone, contacts with any one of the blocks 17 said block will readily yield without causing the rest of the blocks to be necessarily affected thereby.

The rim 10 has a series of ears 27 projecting inwardly from the inner flange 22, said ears being clamped to the different spokes 9 by clamp-plates 28 and clamp screws or bolts 29.

The general operation of the device hereinbefore specifically described is as follows: The wheel as it rotates in the usual manner causes the different blocks 17 to be consecutively brought into contact with the ground, and said blocks will yield slightly, according to the strength of the spiral springs 24. It is probable that about three of these blocks will be in contact with the ground at one time, and as the wheel rotates one of these blocks will leave the surface of the ground, while a new block will come in contact therewith. It is evident that a wheel of the construction hereinbefore described will present a yielding periphery or tire formed by the different blocks which are held pressed outwardly by the spiral springs 24, as hereinbefore described.

Having thus described my invention, what I claim, and desire by Letters Patent to secure, is—

1. A vehicle-wheel comprising in its construction a rim, a series of blocks adapted to slide radially to said wheel, the outer end of each of said blocks, respectively, projecting outwardly beyond the periphery of said rim, each of said blocks having a radial post in the interior thereof surrounded by an annular recess, a series of radial pins each projecting into a recess in its respective post, a spiral spring located in each of said annular recesses encircling said post and acting to move its respective block outwardly, and means to limit the extent of said outward movement.

2. A vehicle-wheel comprising in its construction a rim, a series of blocks adapted to slide radially to said wheel, the outer end of each of said blocks, respectively, projecting outwardly beyond the periphery of said rim, each of said blocks having a radial post in the interior thereof surrounded by an annular recess, a series of radial pins each adapted to guide its respective block in its radially-sliding movement, a spiral spring located in each of said annular recesses and acting to move its respective block outwardly, and means to limit the extent of said outward movement.

3. A vehicle-wheel comprising in its construction a rim, a series of blocks adapted to slide radially to said wheel, the outer end of each of said blocks, respectively, projecting outwardly beyond the periphery of said rim, each of said blocks having a radial post in the interior thereof surrounded by an annular recess, a series of radial pins, each fast to said rim and projecting into a recess in its respective post, a spiral spring located in each of said annular recesses and acting to move its respective block outwardly, and means to limit the extent of said outward movement.

4. A vehicle-wheel comprising in its construction a rim, a series of blocks adapted to slide radially to said wheel, the outer end of each of said blocks, respectively, projecting outwardly beyond the periphery of said rim, each of said blocks having a radial post in the interior thereof surrounded by an annular recess, a series of radial pins, each fast to said rim and projecting into a recess in its respective post, a spiral spring located in each of said annular recesses and acting to move its respective block outwardly, and a cross-pin fast to said pin and projecting into a slot provided in said post.

In testimony whereof I have hereunto set my hand in presence of two subscribing witnesses.

MARCELLUS BUNKER.

Witnesses:
 CHARLES S. GOODING,
 ANNIE J. DAILEY.